(12) United States Patent
Vertel (10) Patent No.: US 8,851,856 B2
(45) Date of Patent: Oct. 7, 2014

(54) ROTOR BLADE COMPRISING STRUCTURAL ELEMENTS

(75) Inventor: John Frederick Vertel, Coronado, CA (US)

(73) Assignee: Rohr, Inc., Chula Vista, CA (US)

( * ) Notice: Subject to any disclaimer, the term of this patent is extended or adjusted under 35 U.S.C. 154(b) by 701 days.

(21) Appl. No.: 12/852,390

(22) Filed: Aug. 6, 2010

(65) Prior Publication Data

US 2012/0034093 A1 Feb. 9, 2012

(51) Int. Cl.
| | |
|---|---|
| *B64C 11/24* | (2006.01) |
| *B64C 3/24* | (2006.01) |
| *B64C 3/18* | (2006.01) |
| *B64C 3/26* | (2006.01) |
| *B64C 27/473* | (2006.01) |

(52) U.S. Cl.
CPC ... *B64C 3/26* (2013.01); *B64C 3/24* (2013.01); *B64C 3/187* (2013.01); *B64C 2027/4736* (2013.01); *B64C 27/473* (2013.01)
USPC .......................................................... 416/233

(58) Field of Classification Search
USPC ...... 416/226, 229 R, 232, 233, 223 R, 236 R, 416/236 A; 224/123.1, 123.3, 123.4, 123.7, 224/123.8, 123.9
See application file for complete search history.

(56) References Cited

U.S. PATENT DOCUMENTS

| | | | | |
|---|---|---|---|---|
| 1,344,640 | A * | 6/1920 | Leinweber | 416/233 |
| 1,765,189 | A * | 6/1930 | Woolgar, Jr. | 244/123.4 |
| 1,827,181 | A * | 10/1931 | Alfaro | 244/117 R |
| 1,922,179 | A * | 8/1933 | Squires | 416/233 |
| 2,036,587 | A * | 4/1936 | Lind | 416/91 |
| 2,248,221 | A * | 7/1941 | Dornier | 416/233 |
| 2,627,928 | A * | 2/1953 | Mullgardt | 416/147 |
| 2,963,094 | A * | 12/1960 | Cantinieau | 416/226 |
| 3,372,757 | A * | 3/1968 | Krohncke | 29/889.72 |
| 3,754,840 | A * | 8/1973 | Zincone | 416/226 |
| 4,621,980 | A * | 11/1986 | Reavely et al. | 416/226 |
| 5,273,806 | A | 12/1993 | Lockshaw et al. | |
| 5,580,622 | A * | 12/1996 | Lockshaw et al. | 428/34.1 |
| 6,994,524 | B2 * | 2/2006 | Owen et al. | 416/233 |
| 2008/0290215 | A1 | 11/2008 | Udall et al. | |

OTHER PUBLICATIONS

Hemp, W.S, M.A.; On the Application of Oblique Co-ordinates to Problems of Plane Elasticity and Swept-back Wing Structures; Ministry of Supply Aeronautical Research Council Reports and Memoranda R&M No. 2754; Jan. 1950.

(Continued)

*Primary Examiner* — Ned Landrum
*Assistant Examiner* — Kayla McCaffrey
(74) *Attorney, Agent, or Firm* — Sneil & Wilmer, L.L.P.

(57) ABSTRACT

A rotor blade has a chord and a span length perpendicular to the chord. The rotor blade includes a first skin having an inner surface and a first plurality of elements extending from the inner surface. The first plurality of elements are distributed along at least a portion of the span length and inclined with respect to the chord of the rotor blade. A second skin is attached to the first skin so as to form an outer surface of the rotor blade. The second skin has a second plurality of elements extending towards the inner surface of the first skin and engaging with the first plurality of elements to form a plurality of ribs within the rotor blade.

14 Claims, 9 Drawing Sheets

(56) References Cited

OTHER PUBLICATIONS

Hong, Chang-Ho, et al.; Aeroelastic Stability Analysis of a Composite Rotor Blade; J. Am. Helicopter Society, vol. 30, Apr. 1985, pp. 57-67.

Mansfield, E.H., M.A.; Elasticity of a Sheet Reinforced by Stringers and Skew Ribs, with Applications to Swept Wings; Ministry of Supply Aeronautical Research Council Reports and Memoranda R&M No. 2758; Dec. 1949.

Piatak, David, et al.; Stiffness Characteristics of Composite Rotor Blades with Elastic Couplings; NASA Technical Paper 3641; ARL Technical Report 1279; Apr. 1997.

Smith, Edward C.; Aeroelastic Response and Aeromechanical Stability of Helicopters with Elastically Coupled Composite Rotor Blades; P.h.D Dissertation, University of Maryland, 1992.

K.A. Yuan, et al.; Aeroelasticity and Structural Optimization of Composite Helicopter Rotor Blades With Swept Tips; NASA Contract Report 4665; May 1995.

* cited by examiner

ROTOR BLADE COMPRISING STRUCTURAL ELEMENTS

BACKGROUND

1. Field of the Invention

The invention relates generally to structural elements in aeronautical blades, and, more particularly, to structural optimization of rotor and turbine blades.

2. Description of the Related Art

Rotor blades are aerodynamically complex structures that are subjected to intense deflection forces and are thus required to satisfy numerous design requirements. For example, blades commonly used on wind turbines and rotary aircraft must satisfy specific strength, fatigue life, damage tolerance, performance, vibration, weight, and aeroelastic stability criteria. At present, wind turbines blades and helicopter main rotor blades are largely constructed of composite materials using a spanwise single or multiple box spar design. Box beam spar designs can also include foam cores designed to prevent "oil canning," deformation or buckling of the sheet material forming the outer skin of the rotor blade.

Current box beam spar designs are not readily improved for optimal stiffness, aeroelastic coupling, and other performance criteria, however. The structural and aeroelastic limits of box spar designs are often managed by changing the blade skin and solid core to increase stiffness and improve aeroelastic coupling. For example, biased ply lay-up techniques may be used to increase stiffness in the blade skin, or honeycomb or polyethylene cores may be used to improve stiffness and aeroelastic coupling of the blade. These features, however, provide marginal performance gains overall.

Thus, providing a rotor blade with optimal stiffness, aeroelastic stability, and performance characteristics remains a significant challenge in aeronautical engineering applications.

SUMMARY

The devices of the present invention have several features, no single one of which is solely responsible for its desirable attributes. Without limiting the scope of this invention as expressed by the claims which follow, its more prominent features will now be discussed briefly. After considering this discussion, and particularly after reading the section entitled "Detailed Description," one will understand how the features of this invention provide several advantages over current designs.

An aspect of the present invention involves a rotor blade having a chord and a span length perpendicular to the chord. The rotor blade comprises a first skin having an inner surface and a first plurality of elements extending from the inner surface, the first plurality of elements being distributed along at least a portion of the span length and inclined with respect to the chord of the rotor blade by an angle greater than 0°. The rotor blade further comprises a second skin attached to the first skin so as to form an outer surface of the rotor blade, the second skin having a second plurality of elements extending towards the inner surface of the first skin and engaging with the first plurality of elements when the second skin is attached to the first skin, the first plurality of elements and the second plurality of elements forming a plurality of ribs within the rotor blade.

In another aspect of the invention, the rotor blade has a chord parallel to a y-axis and a span parallel to an x-axis. The rotor blade comprises a leading edge and a trailing edge separated by a first distance measured along the y-axis of the rotor blade and a plurality of structural elements extending along at least a portion of the first distance between the leading edge and the trailing edge. The plurality of structural elements is inclined with respect to the y-axis at an angle greater than 0°.

In another aspect of the invention, the rotor blade has a chord and a span length perpendicular to the chord. The rotor blade comprises a blade root and a blade tip separated by the span length of the rotor blade, a leading edge and a trailing edge separated by the chord of the rotor blade, and a spar located between the leading edge and the trailing edge of the rotor blade. The rotor blade further comprises a first plurality of ribs inclined with respect to the chord of the rotor blade by an angle greater than 0° and a second plurality of ribs intersecting the first plurality of ribs. The second plurality of ribs is inclined with respect to the chord of the rotor blade by an angle less than 0°.

Further aspects, features and advantages of the present invention will become apparent from the detailed description that follows.

BRIEF DESCRIPTION OF THE DRAWINGS

These and other features, aspects, and advantages of the present invention will now be described in connection with embodiments of the present invention, in reference to the accompanying drawings. The illustrated embodiments, however, are merely examples and are not intended to limit the invention.

DETAILED DESCRIPTION

The following detailed description is directed to certain specific embodiments of the invention. However, the invention can be embodied in a multitude of different ways as defined and covered by the claims. In this description, reference is made to the drawings wherein like parts are designated with like numerals throughout.

Embodiments of the invention can structurally optimize rotor blades for helicopters, wind turbines, and other aeronautical applications. Embodiments of rotor blades described herein can possess optimal strength (stiffness) and aeroelastic stability; advantageously vary in size, contour, configuration, and material construction; and alleviate vibration while minimizing blade weight and multiple coupled natural frequencies. For example, rotor blade structures described herein can allow for large variations in radial bending stiffness using an asymmetric multi-cell structural element. The asymmetric multi-cell structural element can comprise an anisotropic section of interlocking ribbing within a rotor blade that provides enhanced bending-axial-torsion elastic couplings throughout the entire blade. The specific geometry of the improved structural elements described herein, including the taper, twist, width, planar shape, periodicity, and location of the ribbing in the rotor blade structure, and the interlocking nature of bonded two-piece designs of rotor blades described herein, can advantageously support a rib-and-beam construction that is more easily manufactured than present designs.

Figure 1:
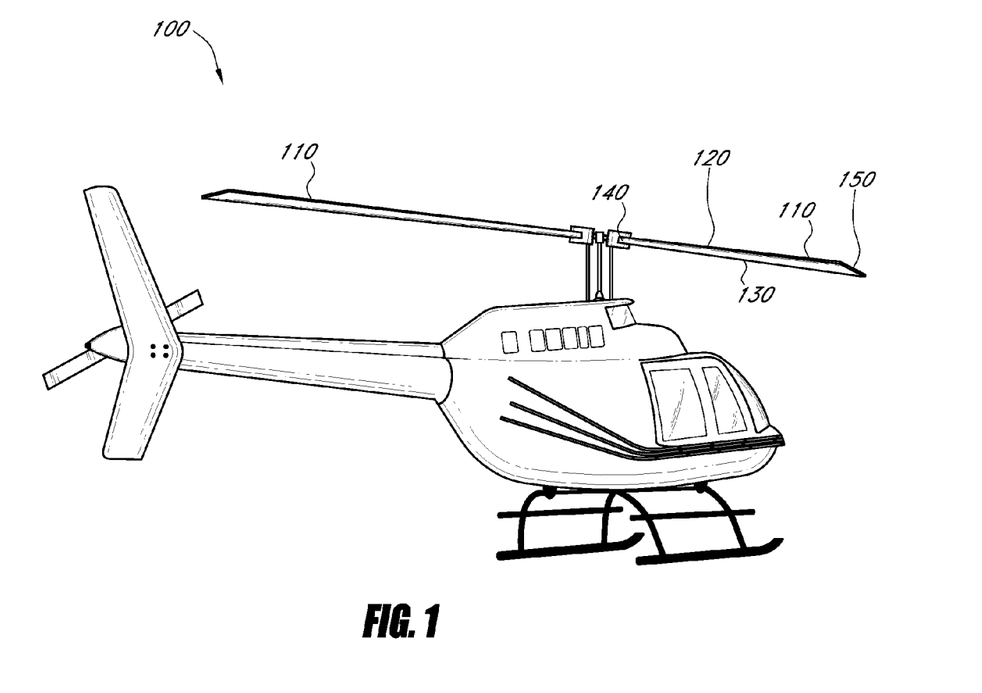
FIG. 1 is a perspective view of an aircraft having rotor blades with structural elements according to a preferred embodiment of the present invention.

FIG. 1 is a perspective view of an aircraft 100 having rotor blades 110 with internal structural elements according to a preferred embodiment of the present invention. Each rotor blade 110 comprises an upper skin 120, a lower skin 130, a blade root 140, and a blade tip 150. The rotor blade 110 also includes an arrangement of multi-cell structural elements disposed between the upper and lower skins 120, 130. The structural elements improve the bending stiffness of the rotor blade 110 and allow the blade 110 to sustain large radial variations. While the rotor blades 110 illustrated in FIG. 1 are sized for a conventional aircraft, it will be understood that embodiments of the structural elements described herein are not limited to aircraft rotor blades and can be used in blades of widely varying sizes and shapes. For example, embodiments of the present invention can be used in the wings of fixed-wing aircraft and wind turbine blades, which can range in length from 100 to 400 feet. Additionally, embodiments of blades described herein can be used in propellers and structures in various aircraft, watercraft, and amphibious craft, including but not limited to turboprop engines, propeller jets, hydrofoils, and propulsions systems in hovercraft and air-cushioned landing craft. Aspects of the present invention can also be used in fan blades of various engines, including but not limited to ultra-high bypass ratio gas turbine engines.

Figure 2:
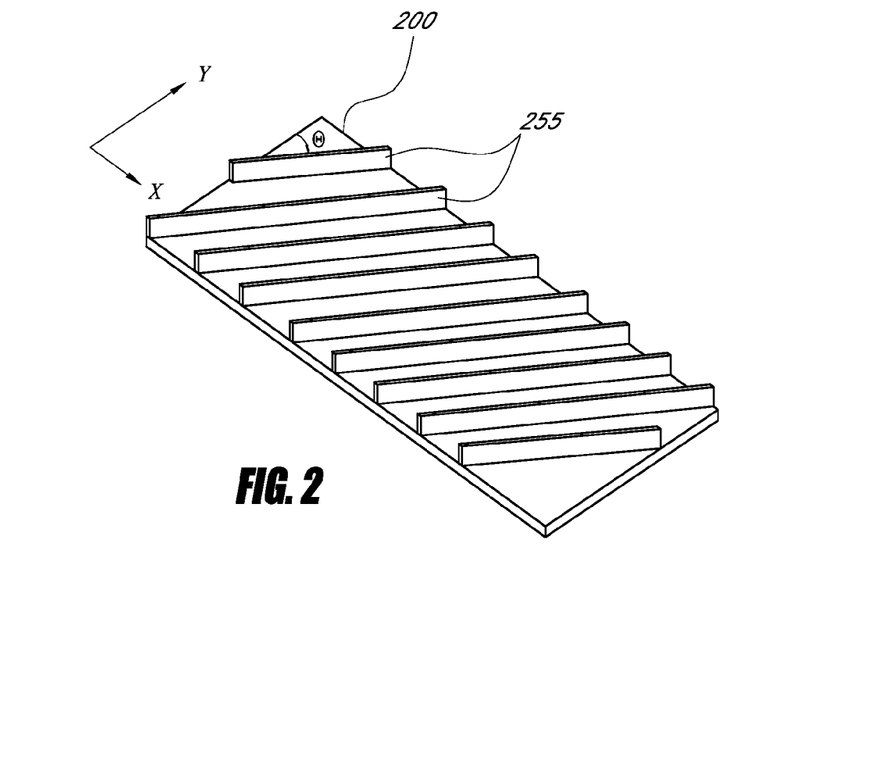
FIG. 2 is a perspective view of a panel comprising structural elements according to another embodiment of the invention.

FIG. 2 is a perspective view of a panel 200 with an arrangement of structural elements or ribs 255 extending in an upward direction from the panel 200 according to one aspect of the present invention. In one embodiment, the panel 200 comprises the lower skin 130 of a rotor blade 110, and the ribs 255 are arranged within the rotor blade 110 between the upper and lower skins 120, 130.

Figure 3:
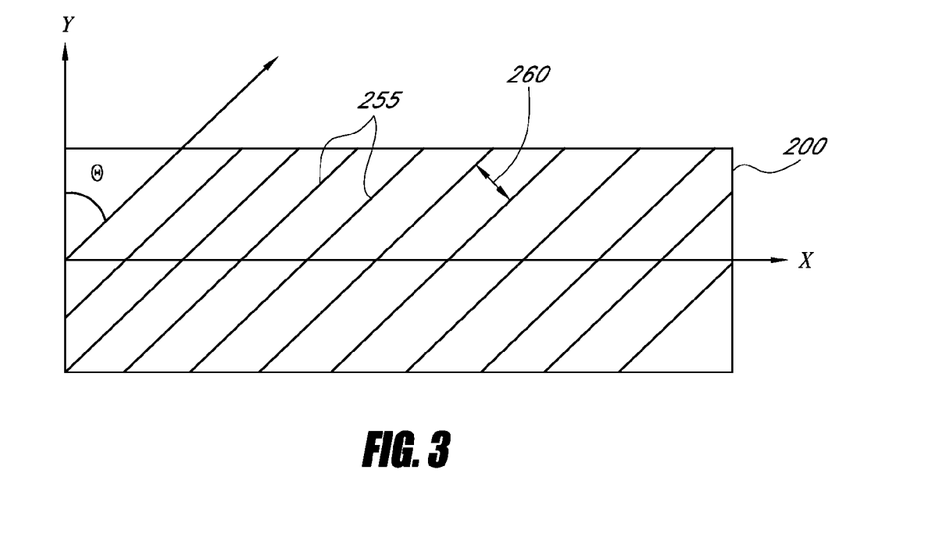
FIG. 3 illustrates an orientation of the structural elements of FIG. 2 with respect to the panel.

FIG. 3 illustrates the orientation of the ribs 255 relative to the panel 200. As shown in FIGS. 2 and 3, the ribs 255 are inclined with respect to a y-axis of the panel 200 by an angle θ. In preferred embodiments of the present invention, the angle θ is greater than 0°. In the embodiment illustrated in FIG. 3, the ribs 255 are inclined with respect to the y-axis by an angle θ of about 45°.

Figure 4:
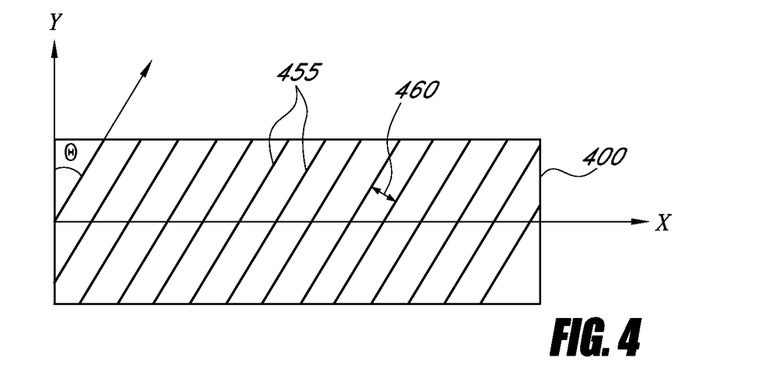
FIG. 4 illustrates the orientation of another embodiment of structural elements with respect to a panel.

FIG. 4 illustrates another embodiment of ribs 455 arranged on a panel 400. In FIG. 4, the ribs 455 are inclined with respect to the y-axis by an angle θ of about 30°. It will be understood that arrangements of ribs described herein are not limited to inclination angles θ of 30° or 45°. Other angles θ are possible, for example an angle θ of about 15°, 20°, 25°, 35°, 40°, 50°, 55°, 60°, 65, 70°, 75°, and angles therebetween.

As used herein, the term "about" or "approximately" means within an acceptable error range for the particular value as determined by one of ordinary skill in the art, which will depend in part on how the value is measured or determined, e.g., the limitations of the measurement system. For example, "about" can mean within 1 or more than 1 standard deviation, per the practice in the art. Alternatively, "about" can mean a range of up to 20%, preferably up to 10%, more preferably up to 5%, and more preferably still up to 1% of a given value. In one embodiment, a rib angle θ of "approximately 30°" means an angle θ that is 30° plus or minus 1%. In another embodiment, a rib angle θ of "approximately 30°" means an angle θ that is 30° plus or minus 5%. Where particular values are described in the application and claims, unless otherwise stated the terms "about" and "approximately" mean an acceptable error range for the particular value.

Referring again to FIG. 3, the pitch 260 is the orthogonal distance between two adjacent ribs 255 arranged on the panel 200. In the embodiment illustrated in FIG. 3, the pitch 260 is the same or substantially the same for any two adjacent ribs 255 such that the ribs 255 are evenly spaced across the panel 200. Similarly, referring to FIG. 4, the pitch 460 is the same or substantially the same for all of the ribs 455 such that the ribs 455 are evenly spaced across the panel 400.

Figure 5:
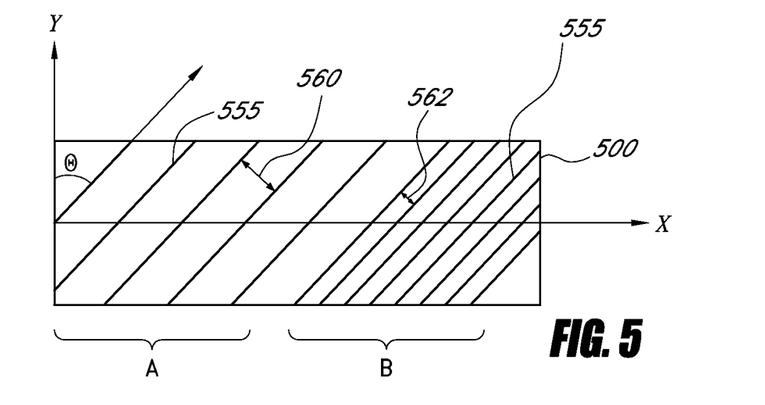
FIG. 5 illustrates the orientation of yet another embodiment of structural elements with respect to a panel.

FIG. 5 illustrates another embodiment of ribs 555 arranged on a panel 500 that has more than one region. For example, the pitch 560 of the ribs 555 in a first region A of the panel 500 is different than the pitch 562 in a second region B of the panel 500. In this embodiment, for example, the pitch 560 of the ribs 555 in a region A is approximately three times the pitch 562 of the ribs 555 in a region B. In another embodiment (not shown), the pitch 560 of the ribs 555 in a region A is approximately two, four, or five times the pitch 560 of the ribs 555 in a region B of the panel 500. It will also be understood that the pitch 560 in the region A can be less than, rather than greater than, the pitch 562 in the region B in some embodiments. Other pitch variations and configurations are possible. For instance, the pitch of the ribs arranged on the panel or in a rotor blade may be constant in one or more regions and variable in one or more other regions.

Blade with Rib Configuration

Figure 6A:
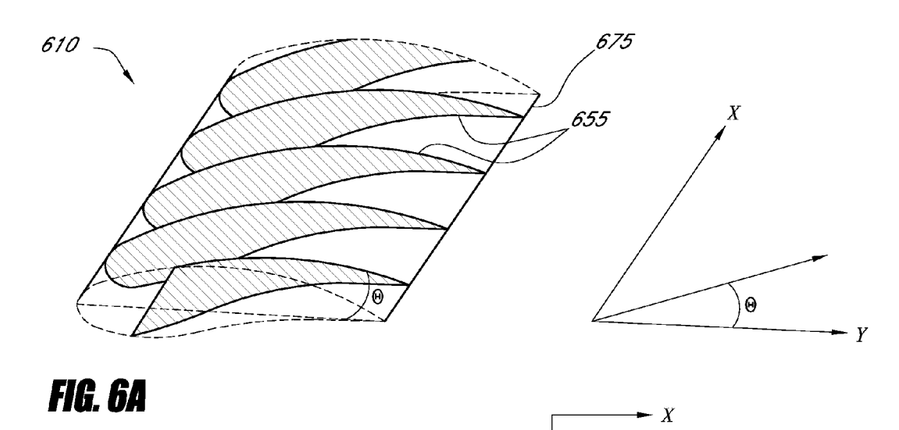
FIG. 6A is a partial cross-sectional view of a rotor blade having ribs oriented according to one embodiment of the present invention.
Figure 6B:
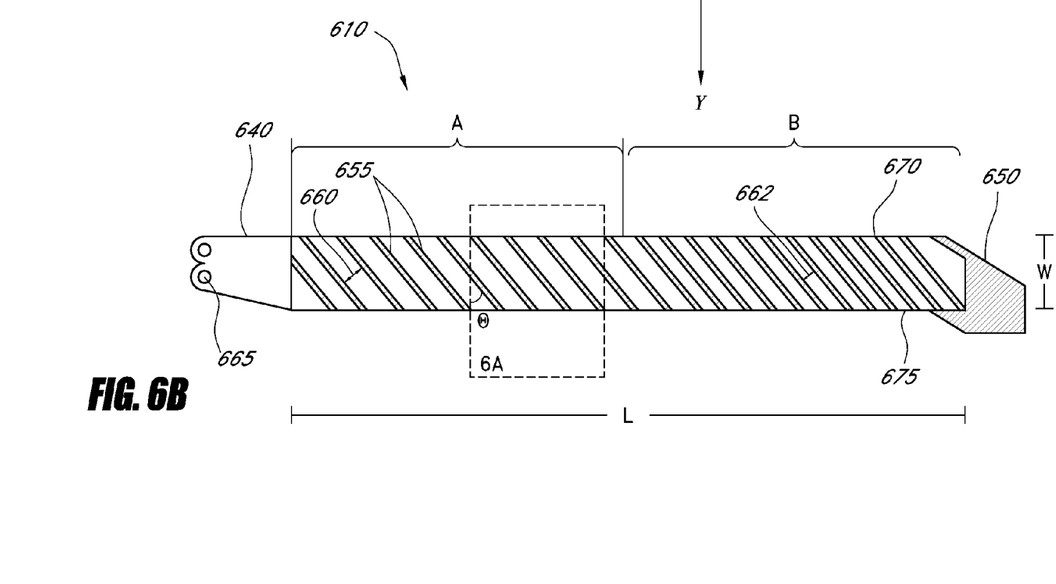
FIG. 6B is a top elevation view of the rotor blade of FIG. 6A.

FIG. 6A is a partial cross-sectional perspective view of a rotor blade 610 that has pitched ribs 655 according to one embodiment of the invention. FIG. 6B is a top elevation view of the rotor blade 610 illustrating the arrangement of the ribs 655 within the rotor blade 610. The rotor blade 610 includes a blade root 640, a blade tip 650, a blade grip 665, a leading edge 670, and a trailing edge 675. The rotor blade 610 has a length L or span length measured along an x-axis of the rotor blade 610. The blade root 640 and the blade tip 650 are separated by the length L of the rotor blade 610. The leading edge 670 and the trailing edge 675 are separated by a width W or chord length measured along a y-axis of the rotor blade 610.

The ribs 655 are disposed along at least a portion of the width W of the rotor blade 610 between the leading edge 670 and the trailing edge 675. In the embodiment illustrated in FIG. 6B, the ribs 655 extend the entire width W between the leading edge 670 and the trailing edge 675. As described above with reference to FIGS. 2-4, the ribs 655 are preferably inclined relative to a y-axis of the rotor blade 610. In this embodiment, the ribs 655 are inclined with respect to the y-axis of the rotor blade 610 by an angle Θ. The angle Θ can range from about 15° to about 75° as explained in further detail above with reference to FIG. 4.

In some aspects, the angle θ of the ribs 655 with respect to the y-axis of the rotor blade 610 is constant across each of the ribs 655 in the rotor blade 610. In other aspects, the angle θ of the ribs 655 with respect to the y-axis of the rotor blade 610 varies from one region to another within the rotor blade 610.

The ribs 655 are arranged within the rotor blade 610 in an asymmetrical configuration such that the pitch between the ribs 655 varies across the length L of the rotor blade 610. The pitch 660 of the ribs 655 in a region A of the rotor blade 610 is greater than the pitch 662 of the ribs 655 in a region B of the rotor blade 610. In another embodiment (not shown), the pitch of the ribs 655 is constant across the rotor blade 610 such that the distance between any two adjacent ribs 655 is the same or substantially the same.

The ribs 655 are disposed along at least a portion of the length L of the rotor blade 610 measured along the x-axis of the rotor blade 610. In one embodiment, the ribs 655 are disposed along the entire length L of the rotor blade. In other aspects described in detail with reference to FIG. 9, the ribs are disposed in one or more regions along the length L of the rotor blade, where the regions are less than the total length L.

Accordingly, the angle θ of the ribs 655 with respect to the y-axis of the rotor blade 610, the pitch of the ribs 655 within the rotor blade 610, and the location of the ribs 655 along the length of the rotor blade 610 can be varied in embodiments of the present invention. Varying the angle θ, the pitch of the ribs 655, and the location of the ribs 655 along the x-axis as described herein can improve the aerodynamic properties of the blade 610. For example, embodiments of the rib orientations described herein can prevent or minimize oil canning in the outer skin of the blade 610, and improve the stiffness and aeroelastic coupling characteristics of the blade 610. Further, the various arrangements of ribs disclosed herein can be incorporated into a rotor blade that also includes foam or other support structure between the upper and lower skins of the rotor blade.

Blade with Rib Configuration and Spar

Figure 7A:
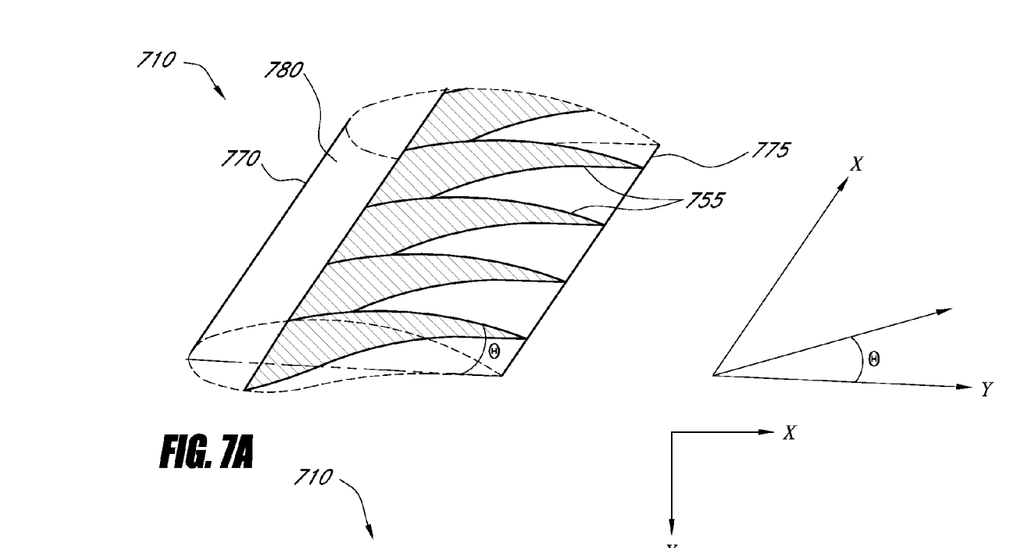
FIG. 7A is a partial cross-sectional view of a rotor blade having ribs and a leading-edge spar according to another embodiment of the present invention.
Figure 7B:
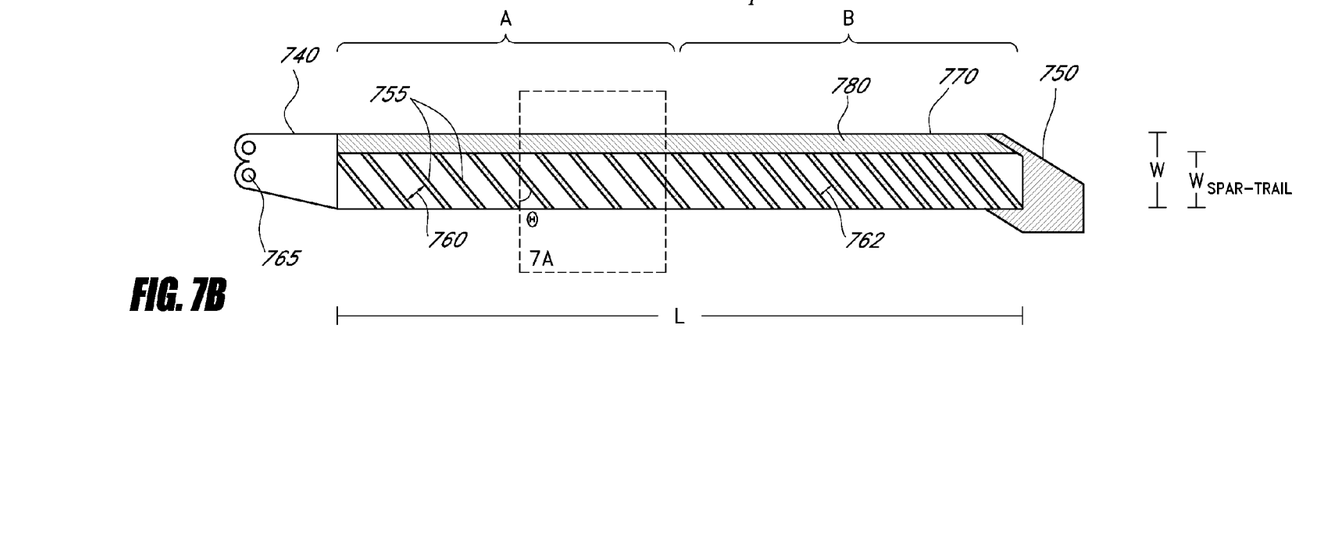
FIG. 7B is a top elevation view of the rotor blade of FIG. 7A.

FIG. 7A is a partial cross-sectional perspective view of ribs 755 in a rotor blade 710 according to another embodiment of the invention. FIG. 7B is a top elevation view of the rotor blade 710 illustrating the arrangement of the ribs 755 within the rotor blade 710. The rotor blade 710 comprises a spar 780 extending along at least a portion of the length L or span of the rotor blade 710 measured along an x-axis of the rotor blade 710. The spar 780 can be a structural member of the blade 710, configured to carry flight loads when the blade 710 is in motion and the weight of the blade 710 when the blade 710 is not in motion. In the embodiment illustrated in FIG. 7B, the spar 780 extends substantially along the entire portion of the length L of the rotor blade 710.

The spar 780 is located between the leading edge 770 and the trailing edge 775 and spaced from the trailing edge 775 by a distance $W_{SPAR-TRAIL}$ measured along the y-axis of the rotor blade 710. In one embodiment illustrated in FIG. 7B, the spar 780 is located adjacent to the leading edge 770. The ribs 755 extend the distance $W_{SPAR-TRAIL}$ between the spar 780 and the trailing edge 775 of the rotor blade 710. As described in detail below with reference to FIG. 8B, other configurations fall within the scope of this invention. Additionally, one portion of the spar 780 can be located near the leading edge 770, while another portion of the spar 780 can be near the trailing edge 775. The remaining portions of the blade which do not comprise portions of the spar 780 can comprise ribs 755.

The ribs 755 are inclined with respect to the y-axis of the rotor blade 710 by an angle θ. In some embodiments, a first portion of the ribs 755 are inclined with respect to the y-axis at a first angle $θ_1$ and a second portion of the ribs 755 are inclined with respect to the y-axis at a second angle $θ_2$. The angles $θ_1$ and $θ_2$ can be different. Blades that do not comprise a spar, such as the embodiment illustrated in FIGS. 6A and 6B, can also include a first portion of ribs inclined with respect to the y-axis at a first angle $θ_1$, and a second portion of ribs inclined with respect to the y-axis at a second angle $θ_2$ that is different than the first angle $θ_1$.

Additionally, the pitch of the ribs 755 can remain constant along the length L of the rotor blade 710, or the pitch can vary along the length L of the rotor blade 710. In the embodiment illustrated in FIG. 7B, the pitch 760 of the ribs 755 in a region A is greater than the pitch 762 of the ribs 755 in a region B of the rotor blade 710.

Thus, the angle θ of the ribs 755 with respect to the y-axis of the rotor blade 710 and the pitch of the ribs 755 within the rotor blade 710 can be constant or can be varied in embodiments of the present invention. In some embodiments of the present invention, the angle θ and the pitch of the ribs 755 are varied in order to optimize the stiffness and aeroelastic stability of the rotor blade 710 along the length L of the rotor blade 710. As described above, the rotor blade 710 can be further optimized by including a spar 780 along the leading edge of the rotor blade 710, in addition to optimizing the angle θ and the pitch of the ribs 755.

Blade with Cross-Rib Configuration and Spar

Figures 8A, 8B:
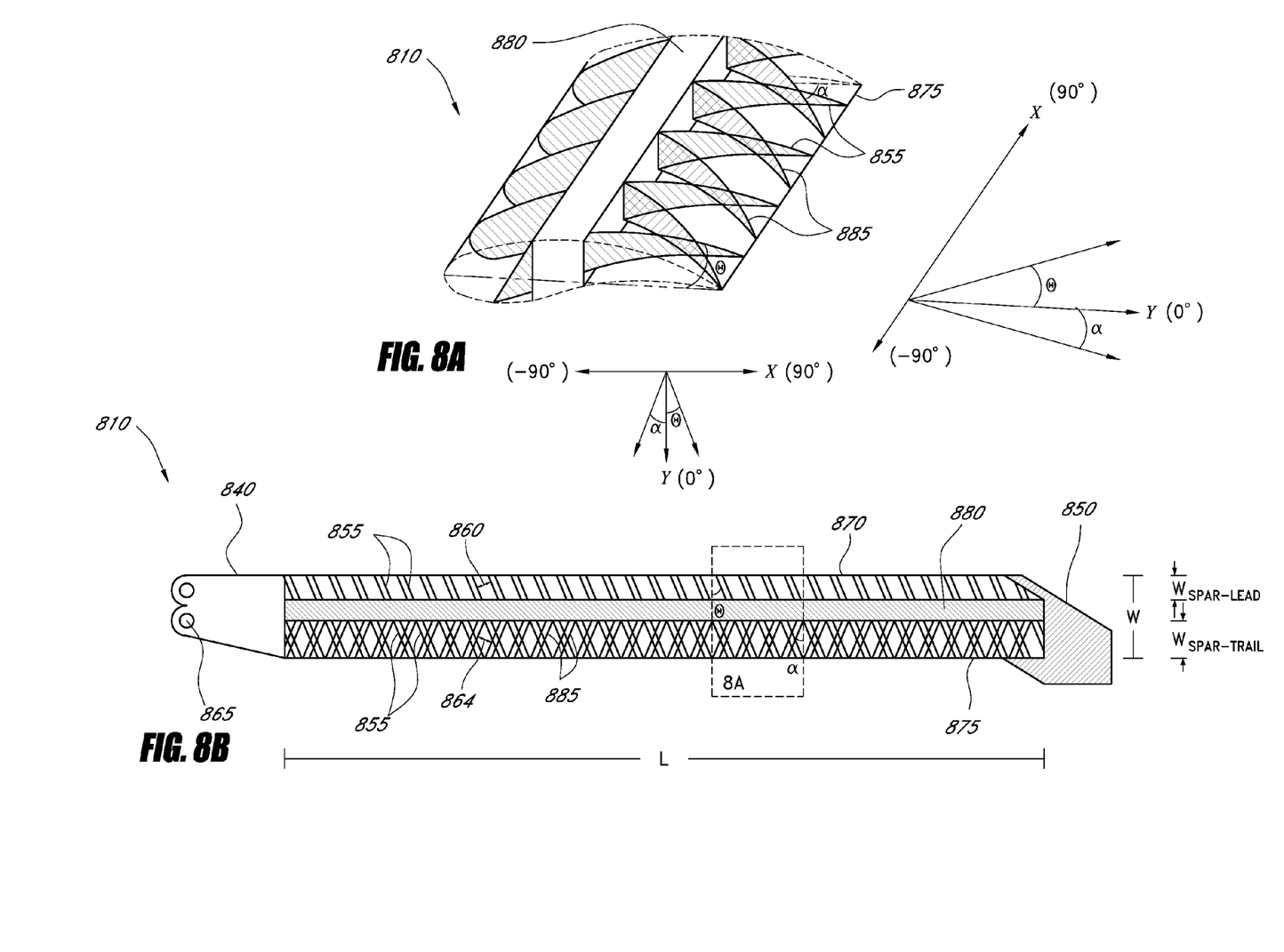
FIG. 8A is a partial cross-sectional view of a rotor blade having intersecting ribs and a mid-blade spar according to yet another embodiment of the present invention.
FIG. 8B is a top elevation view of the rotor blade of FIG. 8A.

FIG. 8A is a partial cross-sectional perspective view of a rotor blade 810 that has a cross-rib configuration according to yet another embodiment of the invention. FIG. 8B is a top elevation view of the rotor blade 810 and illustrates the arrangement of ribs 855 and cross ribs 885 within the rotor blade 810. The rotor blade 810 further comprises a spar 880 located between the leading edge 870 and the trailing edge 875, and between upper and lower skins of the rotor blade 810. As described above, the spar 880 can be a structural member of the blade 810. The spar 880 is spaced from the trailing edge 875 by a distance $W_{SPAR-TRAIL}$ measured along the y-axis of the rotor blade 810. The spar 880 is also spaced from the leading edge 870 by a distance $W_{SPAR-LEAD}$ measured along the y-axis of the rotor blade 810. The ribs 855 extend the entire distance $W_{SPAR-TRAIL}$ between the spar 880 and the trailing edge 875 and the entire distance $W_{SPAR-LEAD}$ between the leading edge 870 and the spar 880. The ribs 855 may extend to the trailing edge 875 of the blade or end short of the trailing edge 875. For example, the ribs 855 illustrated in FIG. 8B extend to the trailing edge 875 while the ribs illustrated in FIGS. 11A and 11B end short of the trailing edge of the blade 1175.

The ribs 855 are inclined with respect to the y-axis of the rotor blade 810 by an angle θ. The pitch 860 of the ribs 855 is constant along the length L or span of the rotor blade 810. In another embodiment, the pitch of the ribs 855 across the length L varies, such that the pitch of the ribs 855 in a first region of the blade 810 is greater or less than the pitch of the ribs 855 in a second region of the rotor blade 810. Of course the rotor blade 810 may include more than two regions.

The rotor blade 810 also comprises cross ribs 885 which intersect the ribs 855. The cross ribs 885 extend the entire distance $W_{SPAR-TRAIL}$ between the spar 880 and the trailing edge 875. In contrast to the ribs 855, the cross ribs 885 in the embodiment illustrated in FIGS. 8A and 8B do not extend between the leading edge 880 and the spar 880. In other embodiments, the cross ribs 885 can extend between the leading edge 880 and the spar 880, in addition to or in lieu of cross ribs 885 extending between the spar 880 and the trailing edge 875. The cross ribs 885 are inclined with respect to the y-axis of the rotor blade 810 by an angle α.

In the embodiment illustrated in FIGS. 8A and 8B, the cross ribs 885 are inclined with respect to the y-axis by an angle α of about −25°. It will be understood that arrangements of ribs described herein are not limited to inclination angles α of −25°. Other angles α are possible, for example an angle α of about −15°, −20°, −25°, −35°, −40°, −50°, −55°, −60°, −65°, −70°, and −75° and angles therebetween.

The cross ribs 885 are arranged evenly-spaced within the rotor blade 810 such that the pitch 864 between the cross ribs 885 is constant or nearly constant across the length L of the rotor blade 810. In another embodiment, the pitch of the cross ribs 885 across the length L is not constant, such that the pitch of the cross ribs 885 in a first region of the blade 810 is greater or less than the pitch of the cross ribs 885 in a second region of the rotor blade 810.

In the embodiment illustrated in FIG. 8B, the rotor blade 810 comprises cross ribs 885 along the entire length L of the rotor blade 810. In other embodiments, the rotor blade 810 includes cross ribs 885 along a portion of the length L. For example, the rotor blade 810 may comprise cross ribs 885 at only one end of the rotor blade 810 closest to the blade tip 850 where additional stiffness is desired. It will also be understood that blades that do not comprise a spar, such as the embodiment illustrated in FIGS. 6A and 6B, can include an arrangement of ribs and cross ribs such as that described above with reference to FIGS. 8A and 8B.

In some aspects, the angle θ and the pitch of the ribs 855 are varied in order to optimize the stiffness and aeroelastic stability of the blade 810. Additionally, the location of a spar 880 within the rotor blade 810 can be varied to further improve the aerodynamic performance of the rotor blade 810. For example, the spar 880 may be disposed closer to the leading edge 870 than what is illustrated in FIG. 8B. The rotor blade 810 can also include cross ribs 885 to further improve the stiffness, aeroelastic stability, and other aerodynamic parameters of the rotor blade 810. The angle α and the pitch 864 of the cross ribs 885, as well as the location of the cross ribs 885 along the length L of the rotor blade 810, can all be varied to improve the aerodynamic performance of the blade 810.

Optimizing Rib Location Within the Blade

Figure 9:
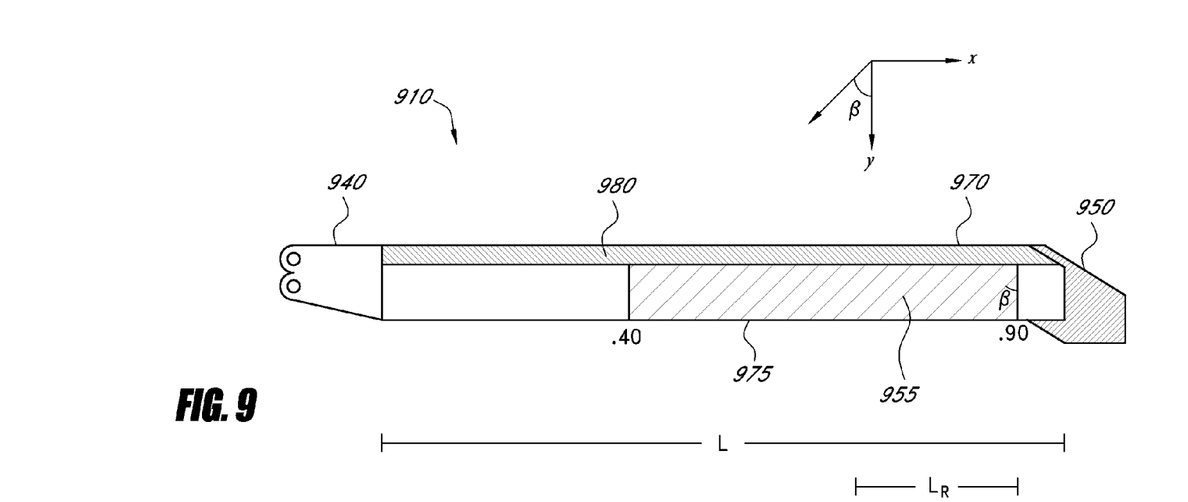
FIG. 9 is a top elevation view of a rotor blade having ribs located within the rotor blade according to an embodiment of the present invention.

FIG. 9 is a top elevation view of a rotor blade 910 according to still a further embodiment of the present invention. The rotor blade 910 includes a blade root 940, a blade tip 950, a leading edge 970, and a trailing edge 975. The rotor blade 910 comprises ribs 955 along a portion $L_R$ of the total length L of the rotor blade 910, where $L_R$ is less than L. The rotor blade optionally comprises a spar 980. The ribs 955 are inclined relative to a y-axis of the rotor blade 910 at an angle β.

In some aspects, the location of the portion $L_R$ along the length L is adjusted or varied in order to optimize the aerodynamic properties of the rotor blade 910. For example, in the embodiment illustrated in FIG. 9, the portion $L_R$ comprising ribs 955 is located in a region that is between about 40% and 90% of the length L measured from the blade root 940. Other configurations are possible. For example, the portion $L_R$ comprising ribs 955 can be located in a region that is about 40% to about 60% of the length L measured from the blade root 940. Alternatively, the portion $L_R$ comprising ribs 955 is located in a region that is about 70% to about 90% of the length L measured from the blade root 940.

Bias Ply Optimization of the Blade Skin

Figure 10:
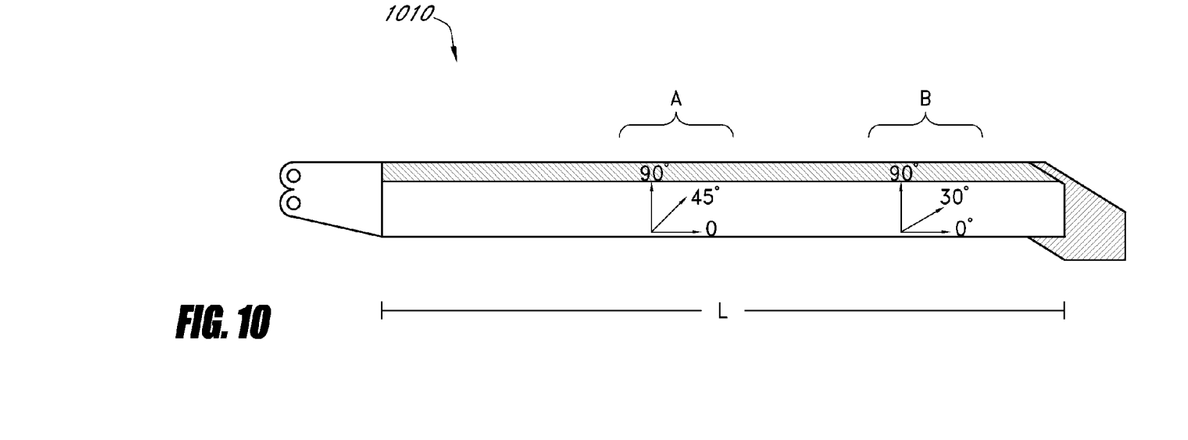
FIG. 10 is a top elevation view of a rotor blade having an outer skin with bias ply optimization according to an embodiment of the present invention.

FIG. 10 is a top elevation view of a rotor blade 1010 according to yet another embodiment of the present invention. The rotor blade 1010 includes a first region A and a second region B along a length L or span of the rotor blade 1010. The rotor blade 1010 may include ribs (not shown) as described in detail above. The rotor blade 1010 also includes an upper skin and a lower skin, as shown in FIG. 1. The upper and lower skins can comprise any suitable material, including but not limited to aluminum, titanium, plastic, composites, fiberglass, or graphite/epoxy fabric. In one embodiment, for example, the upper and lower skin of the blade 1010 comprises fiberglass, which can include glass fibers embedded in a plastic or polymer material. In another embodiment, the upper and lower skins of the blade 1010 comprises graphite/epoxy fabric, which can include fibers. In yet another embodiment, the rotor blade 1010 includes ribs (not shown) which also comprise fiber reinforced materials. In some aspects, the upper and lower skins and the ribs of the blade 1010 comprise the same material.

In some aspects of the present invention, the fibers in the material comprising the skin of the blade 1010 are oriented at an angle relative to the width W or chord length of the blade 1010 measured along a y-axis of the blade 1010. In the embodiment illustrated in FIG. 10, the fibers in the blade skin in the first region A are oriented relative to the y-axis of the rotor blade 1010 at an angle of about 45°. The fibers in the blade skin in the second region B are oriented relative to the y-axis of the rotor blade 1010 at an angle of about 60°. Thus, the fabric comprising the upper and lower skin of the blade 1010 can be oriented such that the fibers in the fabric in different regions of the blade are oriented at different angles relative to the chord length of the blade 1010. This variation in the orientation of blade skin fabric fibers relative to the chord length of the blade, also known as bias ply optimization, can advantageously contribute to the structural integrity and aerodynamic performance of the blade 1010. In some aspects, the orientation of blade skin fibers relative to the chord length of the blade is the same or substantially similar to the orientation of rib fibers relative to the chord length of the blade.

Methods of Manufacturing the Blade

Figure 11A:
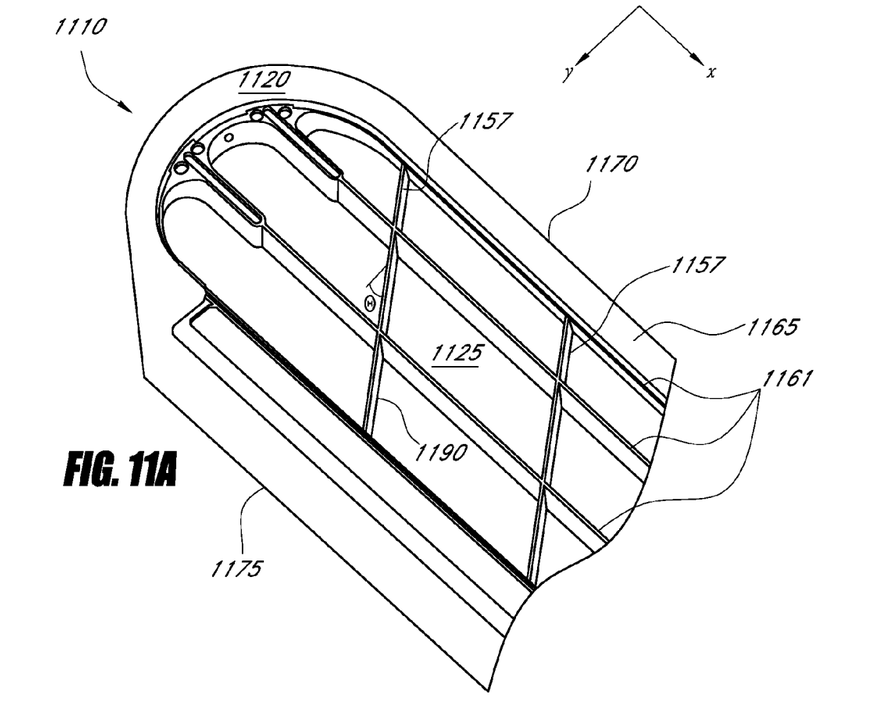
FIG. 11A is a partial cross-sectional view of one-half of a rotor blade having an internal tongue and groove arrangement according to an embodiment of the present invention.
Figure 11B:
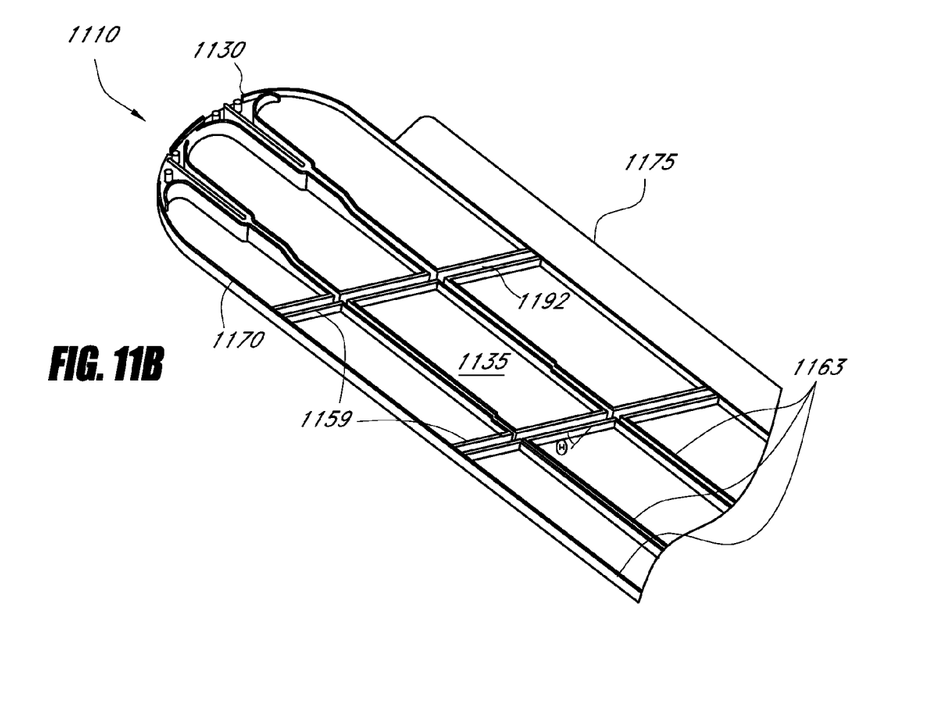
FIG. 11B is a partial cross-sectional view of another half of the rotor blade which is assembled to the rotor blade half of FIG. 11A.

FIG. 11A is a partial cross-sectional view of one-half (e.g., the bottom half) of a rotor blade 1110 having an internal tongue and groove arrangement of structural elements according to an embodiment of the present invention. FIG. 11B is a partial cross-sectional view of the other half (e.g., the top half) of the rotor blade 1110. The rotor blade 1110 comprises a first skin 1120, a second skin 1130, a leading edge 1170, and a trailing edge 1175. The first skin 1120 includes an inner surface 1125 and an opposed outer surface (not shown). The second skin 1130 includes an inner surface 1135 and an opposed outer surface (now shown). When joined or attached together, the first skin 1120 and the second skin 1130 cooperate to form the rotor blade 1110.

As made clear from the discussion above, the rotor blade 1110 includes a plurality of ribs that extend in varying configurations between at least a portion of the distance between the blade's leading edge 1170 and trailing edge 1175. The ribs are comprised of structural elements that include a first plurality of elements 1157 which extend from the inner surface 1125 of the first skin 1120, and a second plurality of elements 1159 which extend from the inner surface 1135 of the second skin 1130. The first plurality of elements 1157 may extend to the very end of the trailing edge 1175, or, as shown in FIG. 11A, may extend near to, but not up to, the trailing edge 1175. The second plurality of elements 1159 may extend to the very end of the trailing edge 1175, or, as shown in FIG. 11B, may extend near to, but not up to, the trailing edge 1175. When the first skin 1120 and the second skin 1130 are joined or attached together, the first plurality of elements 1157 and the second plurality of elements 1159 form a plurality of ribs within the rotor blade 1110. Further, when the first skin 1120 and the second skin 1130 are assembled together, the trailing edge 1175 becomes a structure that does not include the first or second plurality of elements 1157, 1159.

Each of the first plurality of elements 1157 are preferably inclined relative to a y-axis of the rotor blade 1110. In this embodiment, the first plurality of elements 1157 are inclined with respect to the y-axis of the rotor blade 1110 by an angle θ between about 15° to about 75° as explained in further detail above with reference to FIG. 4. The second plurality of elements 1159 are also inclined relative to the y-axis of the rotor blade 1110 a corresponding amount, such that the when the first skin 1120 and the second skin 1130 are joined together, the ribs are inclined relative to the y-axis of the rotor blade 1110 by an angle θ.

The blade 1110 can further comprise one or more spars. The spars extend along at least a portion of the length L or span of the rotor blade 1110 measured along an x-axis of the rotor blade 1110. The spars include a first plurality of spar elements 1161 which extend from the inner surface 1125 of the first skin 1120, and a second plurality of spar elements 1163 which extend from the inner surface 1135 of the second skin 1130. A spar need not extend from both of the first and second skins 1120, 1130. For example, spar 1165 is located near the leading edge 1170 and is not part of the second skin 1130. When the first skin 1120 and the second skin 1130 are joined or attached together, the first plurality of spar elements 1161 and the second plurality of spar elements 1163 form one or more spars within the rotor blade 1110. The location of the one or more spars along the width W or chord length of the blade 1110 can also vary, as described above with reference to FIGS. 7A-8B.

The first skin 1120 and the second skin 1130 can be attached or joined using any suitable method. In one embodiment, the first skin 1120 and the second skin 1130 are interconnected by a tongue and groove arrangement. The first plurality of elements 1157 comprise tongues 1190 and the second plurality of elements 1159 comprise grooves 1192. The first and second plurality of elements 1157, 1159 can be joined by mating the tongues 1190 with the grooves 1192. Similarly, the first plurality of spar elements 1161 comprise tongues and the second plurality of spar elements 1163 comprise grooves. The first and second plurality of elements 1157, 1159 and the first and second plurality of spar elements 1161, 1163 can be joined by mating the tongues with the grooves. Other interfitting/interlocking arrangements are possible, such as but not limited to single-sided grooves mated with tongues, male edges mated with female or forked tongues, other mechanical interlocks, and adhesives. Suitable adhesives include but are not limited to epoxy or urethane glues.

Methods of Manufacturing Using Internal Tooling

Figure 12:
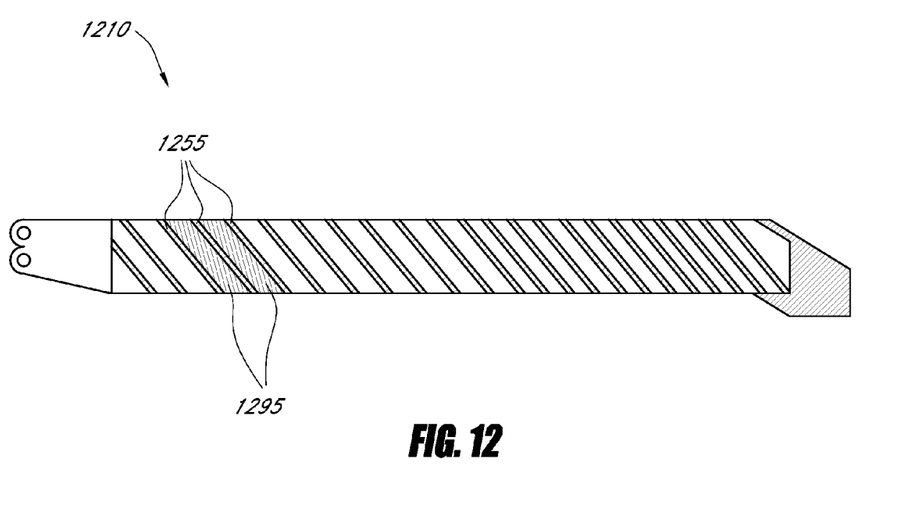
FIG. 12 is a top elevation view of a rotor blade including structural elements and internal tooling features according to one embodiment of the present invention.

FIG. 12 is a top elevation view of a rotor blade 1210 which includes structural elements and internal tooling features according to one embodiment of the present invention. The rotor blade 1210 includes ribs 1255 and internal tooling 1295. Embodiments of rotor blades described herein can be manufactured using composite materials. Once assembled into the desired shape of the blade, the composite materials are then hardened during a curing process. During this process, the rotor blade 1210 and the ribs 1255 can be subjected to heat and pressure that causes fibers in the composite materials to deform from their optimal location. As a result, the ribs 1255 may undergo dimensional deformation, or springback, resulting in surface distortions, material shrinkage, and other structural disadvantages.

These disadvantages can be overcome by placement of internal tooling 1295 in the rotor blade 1210 during the manufacturing and/or curing process. The dimensions of the internal tooling 1295 compensate for the effects of dimensional deformation, such that post cure dimensions of the ribs have advantageous structural stiffness and aeroelastic coupling properties.

A method of manufacturing the rotor blade 1210 is provided in one embodiment. The internal tooling 1295 may be first utilized prior to, during, and/or after the uncured composite material has been assembled into the desired shape of the blade and/or ribs. For example, one or more internal tools 1295 can be placed in two halves of the rotor blade 1210, such as first skin 1120 and second skin 1130 illustrated in FIGS. 11A and 11B prior to forming the ribs 1255. The tooling 1295 is dimensioned to correspond to the desired tolerances of the ribs 1255. Portions of the ribs 1255 are then constructed around the tooling 1295 by laying down layers and/or preforms of composite material in the voids between the tooling 1295. In some aspects, the voids or spaces between the internal tooling 1295 correspond to the final desired shape, contour, and tolerances of the ribs 1255.

The first skin 1120 and its rib portions and the second skin 1130 and its rib portions are separately cured to harden the composite materials. This curing step may be the final cure for the skins 1120, 1130 or can be followed by a subsequent cure of the assembled rotor blade 1210.

After cure, the internal tooling 1295 is then removed from the first skin 1120 and the second skin 1130. The first skin 1120 and the second skin 1130 can then be bonded together to form a plurality of ribs 1255 in the rotor blade 1210, as described above with reference to FIGS. 11A and 11B. Embodiments of rotor blades manufactured using internal tooling as described herein can advantageously account for dimensional deformation which commonly occurs during the curing process, thereby resulting in optimum rib shape and stiffness characteristics.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A rotor blade having a chord and a span length perpendicular to the chord, the rotor blade comprising:
   a first skin having an inner surface, a first plurality of elements extending from the inner surface between a leading edge and a trailing edge, the first plurality of elements passing through a first spar portion, each of the first plurality of elements comprising a tongue portion, the first plurality of elements being distributed along at least a portion of the span length and inclined with respect to the chord of the rotor blade by an angle greater than 0°; and a second skin attached to the first skin so as to form an outer surface of the rotor blade having the leading edge and the trailing edge, the second skin having a second plurality of elements between the leading edge and the trailing edge, the second plurality of elements passing through a second spar portion, each of the second plurality of elements comprising a groove portion, the second plurality of elements extending towards the inner surface of the first skin and engaging with the first plurality of elements when the second skin is attached to the first skin, the first plurality of elements and the second plurality of elements forming a plurality of ribs within the rotor blade, the first spar portion and the second spar portion forming a spar.

2. The rotor blade of claim 1, wherein each of the tongue portions of the first plurality of elements are configured to interlock respectively with each of the grooves of the second plurality of elements to form the plurality of ribs.

3. The rotor blade of claim 1, wherein each of the first plurality of elements are inclined with respect to the chord of the rotor blade by an angle greater than about 15° and less than about 75°.

4. The rotor blade of claim 1, wherein the spar is located between a leading edge and a trailing edge of the rotor blade and spaced from the trailing edge by a first distance measured along the chord of the rotor blade.

5. The rotor blade of claim 4, wherein the plurality of ribs extend through the spar between the leading edge and the trailing edge.

6. The rotor blade of claim 4, wherein the spar is spaced from the leading edge by a second distance measured along the chord of the rotor blade, and wherein the plurality of ribs extend the first distance between the spar and the trailing edge and extend the second distance between the leading edge and the spar.

7. The rotor blade of claim 1, wherein the plurality of ribs extend along a portion of the blade span that is less than the entire blade span.

8. The rotor blade of claim 1, wherein the first skin comprises a first plurality of fibers oriented relative to the chord of the rotor blade at a first angle, and a second plurality of fibers oriented relative to the chord of the rotor blade at a second angle that is different than the first angle.

9. A rotor blade having a chord parallel to a y-axis and a span parallel to an x-axis, the rotor blade comprising:

a leading edge and a trailing edge separated by a first distance measured along the y-axis of the rotor blade;

the rotor blade comprising a top skin and a bottom skin, wherein the top skin and the bottom skin couple together at the leading edge and the trailing edge, and wherein the top skin and the bottom skin form the outer surface of the rotor blade;

a blade root and a blade tip separated by a second distance measured along the x-axis of the rotor blade;

a spar disposed between the top and bottom skin and extending between the blade root and the blade tip;

a first plurality of structural elements extending from the leading edge through the spar to the trailing edge, wherein the first plurality of structural elements supports the top skin and the bottom skin, wherein a subset of the first plurality of structural elements have a first pitch and a second subset of the first plurality of structural elements have a second pitch, and wherein the first subset of the first plurality of structural elements is substantially parallel to the second subset of the first plurality of structural elements;

a second plurality of structural elements extending between the spar and the trailing edge, the second plurality of structural elements are inclined with respect to the y-axis at an angle less than 0°, wherein the second plurality of structural elements supports the top skin and the bottom skin.

10. The rotor blade of claim 9, wherein the first plurality of structural elements and the second plurality of structural elements meet at the spar.

11. The rotor blade of claim 9, wherein the second plurality of structural elements are inclined with respect to the y-axis of the rotor blade by an angle greater than about negative 15° and less than about negative 75°.

12. A rotor blade having a chord and a span length perpendicular to the chord, the rotor blade comprising:

a blade root and a blade tip separated by the span length of the rotor blade;

a leading edge and a trailing edge separated by the chord of the rotor blade;

a spar located between the leading edge and the trailing edge of the rotor blade;

a first plurality of ribs extending between the leading edge and the trailing edge through the spar, the first plurality of ribs having a first pitch, wherein each of the first plurality of ribs being approximately parallel to each of the other first plurality of ribs; and a second plurality of ribs between the spar and the trailing edge, the second plurality of ribs having a second pitch, wherein each of the second plurality of ribs is approximately parallel to each of the other second plurality of ribs.

13. The rotor blade of claim 12, wherein the spar is spaced from the leading edge and the first plurality of ribs further extend through the spar and from the leading edge to the trailing edge.

14. The rotor blade of claim 12, wherein the first plurality of ribs and the second plurality of ribs are located in a region of the rotor blade that is about 40 percent to about 90 percent of the span length of the rotor blade measured from a blade root of the rotor blade.

* * * * *